United States Patent
Reith et al.

(10) Patent No.: US 10,146,944 B2
(45) Date of Patent: Dec. 4, 2018

(54) RECOMBINANT THREAT MODELING

(71) Applicant: T-Mobile USA, Inc., Bellevue, WA (US)

(72) Inventors: Gregory Robert Reith, Federal Way, WA (US); Brett Christopher Peppe, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 413 days.

(21) Appl. No.: 14/958,792

(22) Filed: Dec. 3, 2015

(65) Prior Publication Data

US 2016/0162690 A1    Jun. 9, 2016

Related U.S. Application Data

(60) Provisional application No. 62/088,479, filed on Dec. 5, 2014.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| 8,418,249 | B1* | 4/2013 | Nucci | G06F 21/552 |
|---|---|---|---|---|
| | | | | 706/20 |
| 8,505,092 | B2* | 8/2013 | Durie | H04L 63/1408 |
| | | | | 726/22 |
| 8,584,233 | B1* | 11/2013 | Yang | H04L 63/145 |
| | | | | 709/229 |
| 8,935,784 | B1* | 1/2015 | N | G06F 21/562 |
| | | | | 726/22 |
| 2003/0236652 | A1 | 12/2003 | Scherrer et al. | |
| 2005/0229256 | A2 | 10/2005 | Banzhof | |

(Continued)

FOREIGN PATENT DOCUMENTS

| EP | 1768044 A2 | 3/2007 |
|---|---|---|
| WO | 2014182326 A2 | 11/2014 |

OTHER PUBLICATIONS

"International Search Report and Written Opinion" for Application No. PCT/US2015/064034 dated Jun. 3, 2016, 11 pages.

(Continued)

*Primary Examiner* — Michael R Vaughan
(74) *Attorney, Agent, or Firm* — Han Santos, PLLC

(57) ABSTRACT

Dynamically developing and maintaining threat models, threat landscapes and threat matrices are described. Specifically described are techniques on how to relate: (1) attack surfaces, (2) attack histories, (3) threats and (4) historical responses, by loading these four types of data, as well as other data, into a data store. One example data store disclosed includes some variations of a graph data structure. Upon loading the data, the populated data store may be used to develop Threat Models that will represent a Threat Landscape and a Threat Matrix. These may then be queried for recommended reactive and proactive responses with respect to an installation, in order to improve security.

20 Claims, 7 Drawing Sheets

(56) References Cited

U.S. PATENT DOCUMENTS

| | | | |
|---|---|---|---|
| 2007/0226796 A1* | 9/2007 | Gilbert | G06F 21/55 726/22 |
| 2007/0291118 A1* | 12/2007 | Shu | H04N 7/18 348/156 |
| 2008/0162592 A1* | 7/2008 | Huang | G06F 11/3476 |
| 2009/0077666 A1 | 3/2009 | Chen et al. | |
| 2013/0325545 A1 | 12/2013 | Mordvinova et al. | |
| 2014/0351939 A1* | 11/2014 | Moore | H04L 63/1433 726/25 |
| 2015/0310217 A1* | 10/2015 | Artes | G06F 21/577 726/25 |
| 2015/0381649 A1* | 12/2015 | Schultz | H04L 63/1433 726/25 |
| 2016/0098565 A1* | 4/2016 | Vedula | G06F 21/577 726/24 |
| 2016/0154960 A1* | 6/2016 | Sharma | G06F 21/56 726/25 |
| 2016/0350165 A1* | 12/2016 | LeMond | G06F 11/079 |
| 2017/0346839 A1* | 11/2017 | Peppe | G06F 21/577 |
| 2018/0247058 A1* | 8/2018 | Burt | H04L 63/1441 |

OTHER PUBLICATIONS

Kistner, Jason, "Cyber Attack Simulation and Information Fusion Process Refinement Optimization Models for Cyber Security," Industrial Engineering, Rochester Institute of Technology, Jul. 2006.
Supplementary European Search Report for European Application No. EP 15864973.4 dated Jun. 5, 2018, 7 pages.

* cited by examiner

RECOMBINANT THREAT MODELING

CROSS REFERENCE TO RELATED PATENT APPLICATION

This application claims priority to U.S. Provisional Patent Application No. 62/088,479, filed on Dec. 5, 2014, entitled "Threat Model," which is hereby incorporated by reference in its entirety.

BACKGROUND

Enterprises are constantly under cyber-attack, or electronic attack of computing resources and data (hereinafter all of an enterprise's computing resources and data, not just the connectivity resources, are called a "network"). From 2011-2015 there have been at least seven hundred (700) documented major cyber-attacks on enterprise and government networks in the United States as well as many others outside of the United States. Some attacks to steal data. Others steal money or electronic access to money. Yet others maliciously destroy data, or cause denial of service. These attacks not only degrade the integrity of the specific networks under attack, but also the user's confidence in all networks. Accordingly, cyber security officers and others responsible for computer security, are constantly challenged to defend their networks against cyber-attack.

Cyber security officers are therefore responsible for developing and maintaining a threat model for the networks under their charge. A threat model identifies vulnerabilities in those networks, and ideally identifies or helps identify techniques to mitigate any identified respective computer security risk. Application of those techniques is called remediation.

However, the scale, sophistication, and variety of attacks presently targeting enterprise and government computing resources have increased to the point that analysis of threat data would benefit at least from automation, leverage of third party data, and data sharing.

BRIEF DESCRIPTION OF THE DRAWINGS

The Detailed Description is set forth with reference to the accompanying figures.

DETAILED DESCRIPTION

Context and Overview of Threat Models
The Present Threat Environment in Computer Security The threat environment faced by enterprise and government entities has changed dramatically in the last few years from simple disruption of services ("hacking") to significant economic theft, in terms of both monetary loss, intellectual property, and data. The risk control strategy employed by corporations has been forced to change from one based on policy and controls to one that includes sophisticated security appliances that assess, measure and track vulnerabilities. Most security applications monitor the Security Information and Event Management logs (known as "SIEM") and score the issues discovered, and then put in place a mitigation response for remediation. However as sophisticated corporate risk profiling strategies evolve, those strategies are still defensive and reactive to an ever more dangerous set of offensive adversaries.

Present day enterprises and governments have a critical dependence on information infrastructure to promote their products and services, communicate with their customers and facilitate communication across graphically distributed work sites, employees and data centers. Each of these access points has an attack surface that is defined by its configuration and known vulnerabilities. Successful attacks are characterized by Common Vulnerabilities and Exposures (CVE), Computer Emergency Response Team (CERT) and other reports from security researchers. However, recognizing these attacks is based on after the fact recognition of the attack signature itself.

Figure 1:
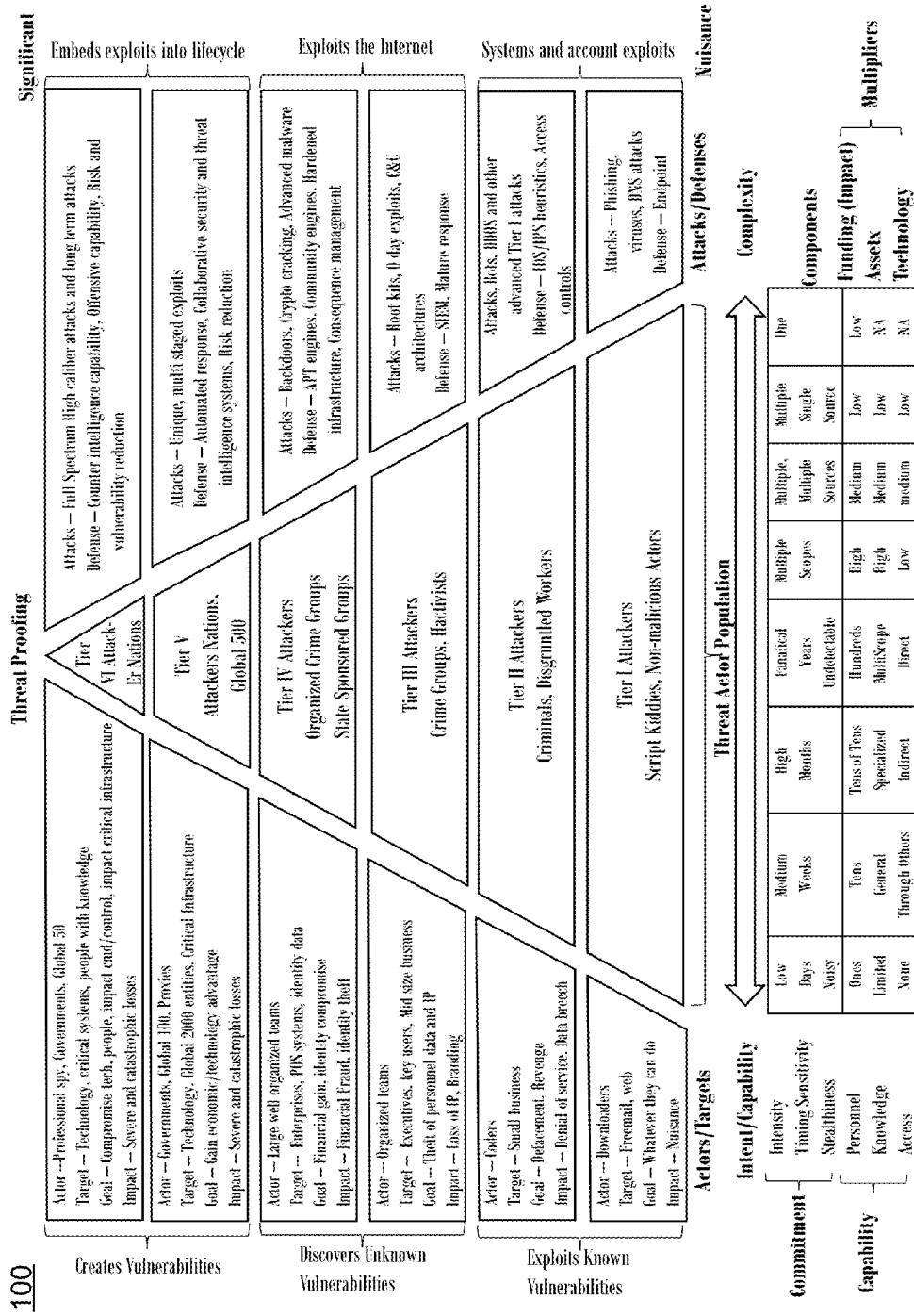
FIG. 1 is diagram of the present day threat space.

The economic incentive that drives and funds the development of ever more sophisticated attacks has led to enormous differentiation in the threat space illustrated in the FIG. 1 threat pyramid 100. It is no longer sufficient to organize and direct risk mitigation and remediation after detection, because it is based on attack signatures that have appeared on the attack surfaces. The threat pyramid 100 represents a more accurate view of the present state of affairs.

Prior art risk management tools deal reasonably well with Tier I and II threats through security policy, data governance and security appliances. Tier VI attacks are essentially invisible to a vulnerability scanning tools because the exploit created a custom vulnerability that did not exist previously and thus has no signature to detect. Tier V attacks are similar in being very difficult to detect and remediate.

Vulnerabilities, Threats, Attacks and Attack Surfaces

A threat can be understood as a particular entity that has the capability and willingness to exploit a vulnerability using different attack processes. For example, older versions of a Windows NT™ server is vulnerable to being crashed by a pinging a weak port (known as the "Ping of Death"). Thus the NT Ping of Death threat is the correlation of the vulnerable port against the pinging of a known port.

In this way, a vulnerability is a weakness in the defenses of a network, often referred to as an attack vector. An attack is the exploiting of that vulnerability. A threat is the party or entity that may perform, or is performing a particular attack. The set of vulnerabilities or attack vectors for a particular portion of the network is called the attack surface for that portion of the network.

Figure 2:
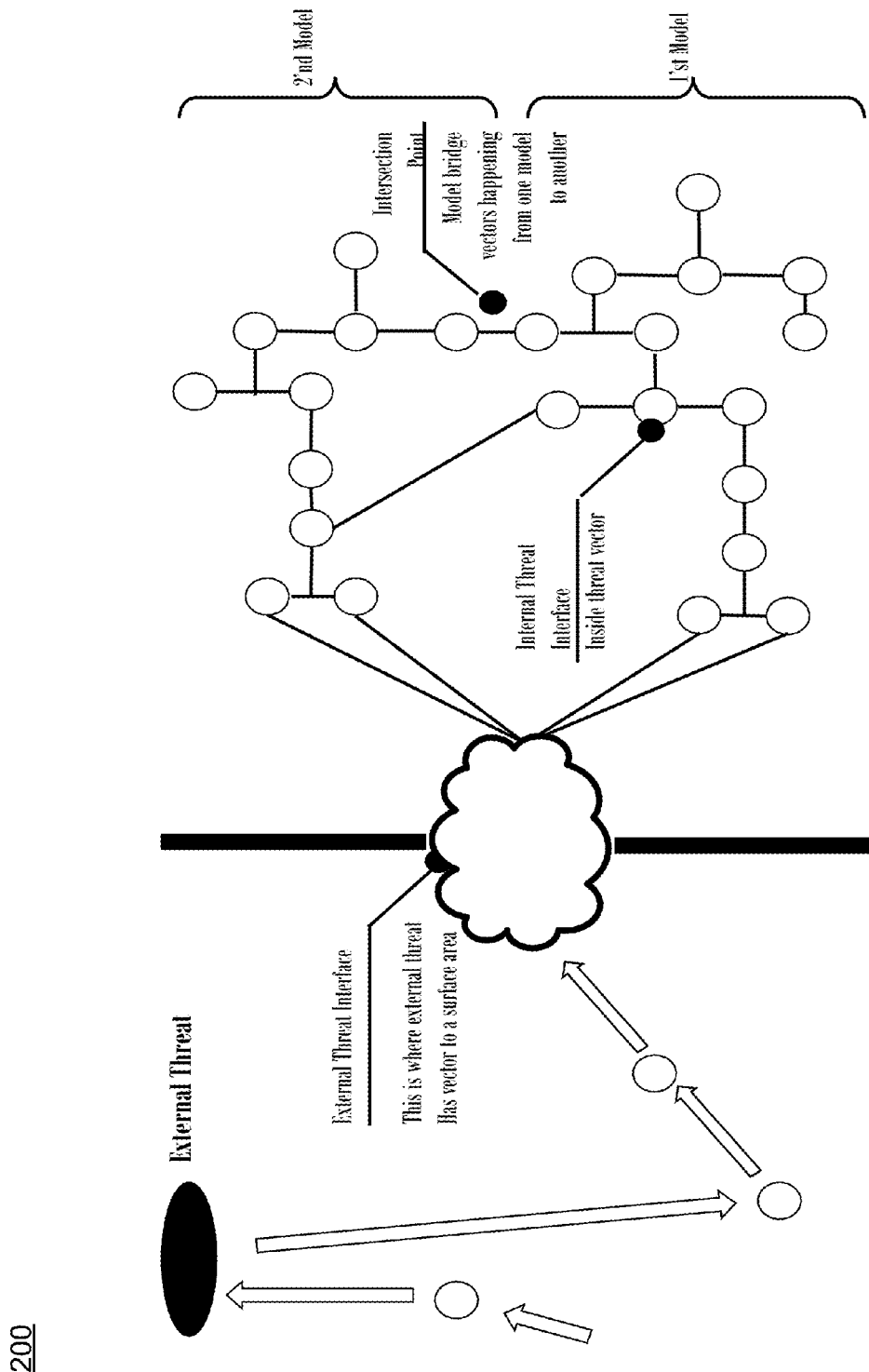
FIG. 2 is a diagram showing the intersection of two threat models within the same threat matrix.

It is important to point out that threats need not make use of vulnerabilities that are technical in nature, but may be non-technical (e.g. a threat from a compromised worker or disgruntled worker). This is illustrated in FIG. 2 where a Threat Model comprises an external Attack Surface including an attack vector (such as an NT Ping of Death), and an internal Attack Surface (such as a disgruntled employee).

Attack Trees

Attack surfaces are often represented with attack trees. Attack trees are computer security constructs that store the preconditions and antecedents for vulnerabilities in a computer network. Typically the tree will be comprised of a parent node each with a set of child nodes. Child nodes interior to the tree will have their own respective child nodes (grandchild nodes to the parent node). Child nodes that do not have their own child nodes are leaf nodes. Each parent node stores a potential vulnerability to a network. The child nodes for that parent node are potential vectors to exploit the vulnerability stored in the parent node. For example, a parent node may store the notion that a virus may infect a file. The parent node may have a first child node storing the vector of the virus executing as an administrator and a second child node storing the vector of the virus executing with non-administrative privileges. The child node storing the vector of the virus executing as an administrator may in turn have its own respective child nodes storing the notion of the virus exploiting a root hole and the notion of the virus running with a compromised administrative account.

Because, attack trees store attack vectors, attack trees are used to develop threat matrices. A threat matrix is a master list of all threats to a network, cross referenced to potential remediation responses. However, because attack trees do not store explicit responses, they do not provide remediation information to develop a complete threat matrix. Furthermore, prior art techniques for developing attack trees is fundamentally manual in nature. Accordingly, developing and maintaining attack trees is complex and time consuming. Specifically, prior art attack tree techniques do not have the capability to dynamically generate attack trees.

An attack tree may be developed for a particular class of vulnerabilities. For example, a first attack tree may store vulnerabilities from technical attacks and a second attack tree may store vulnerabilities from social attacks. Those two attack trees may also be combined into a single threat matrix.

However, with prior art techniques, preconditions for attacks stored in the two attack trees would not be correlated together, despite being in the same Threat Matrix. Specifically, prior art techniques do not contemplate a child node in one attack tree being a potential precondition and therefore a potential child in a second attack tree.

In general, prior art threat modeling techniques suffer from having a single threat actor goal. Specifically, prior art processes for developing a threat model are linear in nature, even though real world attacks can be lateral, i.e. attacks initially stored in one attack tree eventually evolve into an attack stored in another attack tree. For example, an indicator that an attack under a social model (i.e. stored in an attack tree comprised of social and/or human factor data) is not used as an indicator to expect a technical threat (i.e. store in an attack tree comprised of technical attack data). For example, knowledge that an employee has been bypassed for a raise for the past three reviews may not trigger a response to check that the employee is an IT worker and may attempt to do a technical attack against a server.

Attack trees do lend themselves to incorporating data from many data sources, internal and external to organizations. However in practice, Threat Matrices often only use as input internally developed Threat Models. All too often, Threat Matrices are not updated with events on other installations not under the responsibility of the Corporate Security Officer. This is often a result not only of not having access to third party data, but also of prior art techniques already being time intensive to develop an attack tree from internal data alone.

Recombinant Threat Models
Threat Models, Threat Landscapes, Threat Matrices

Herein we describe novel techniques to develop a threat model called a Recombinant Threat Model, which recognizes differentiation in the threat space. A Recombinant Threat Model maps threats and their respective attack vectors. Recombinant Threat Models may be combined into a series of overlapping "threat landscapes". The threat landscapes may then be combined into a final "threat matrix" for an installation. Because of the properties described herein, Recombinant Threat Models may be cross correlated, and may be extended using third party data.

"Attack surfaces" are generally presented in the context of a family of potential threats, called a threat model. For example, one attack surface may be comprised of threats from weak encryption. Another attack surface may be comprised of threats from inadvertently exposed points in a server. Yet another attack surface may be comprised threats from human factors (e.g. disgruntled employees, compromised employees, human error).

Figure 3:
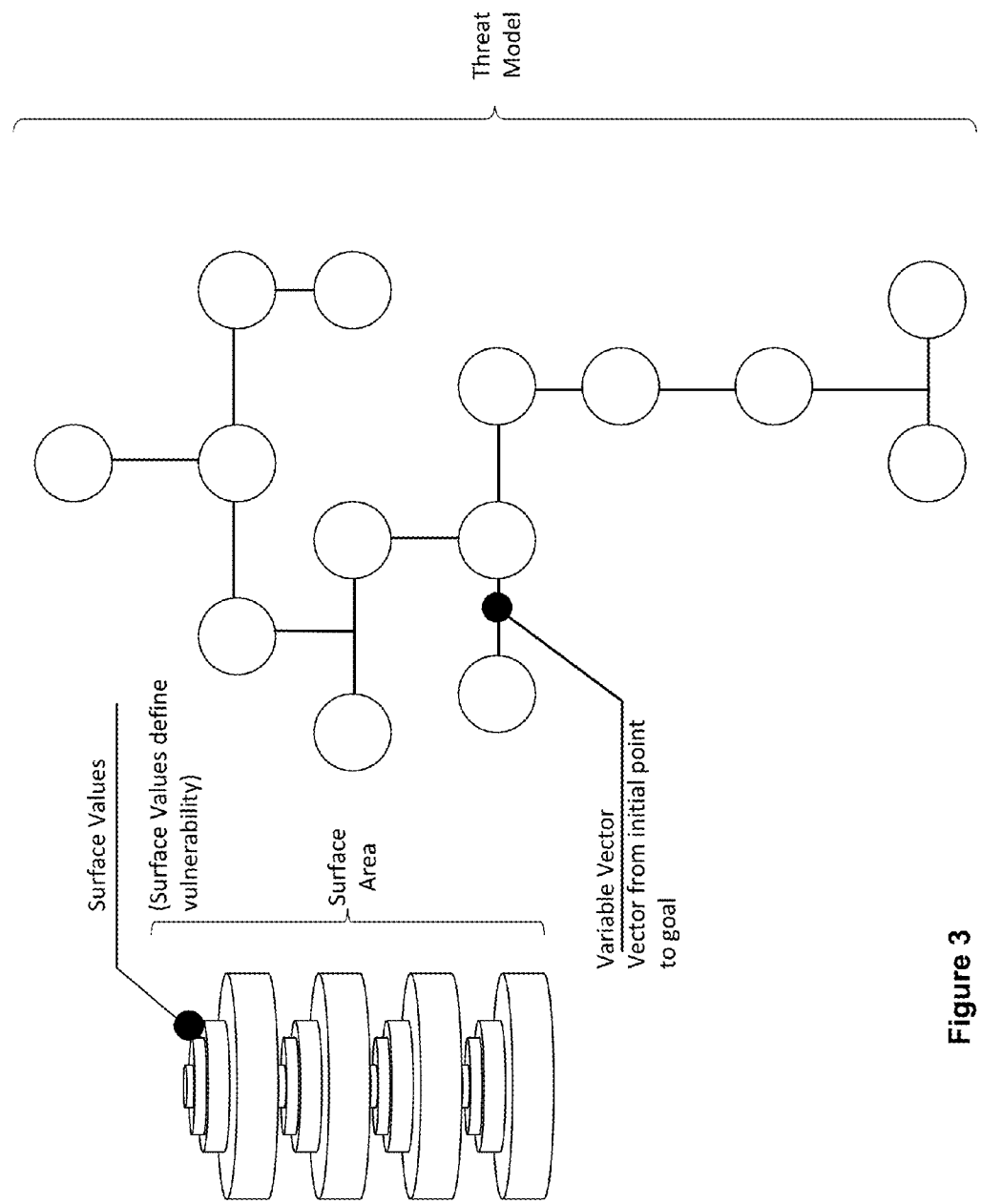
FIG. 3 illustrates the context of threats, attack vectors (vulnerabilities), and threat models.

A Recombinant Threat Model can be constructed as an array of attack surfaces with their respective attack vectors relative to one or more assets (see FIG. 3). Attack surfaces are composed of vulnerabilities associated with one or more attributes describing the respective vulnerability. Surface areas may have one or more "attack vectors", and a threat accesses an attack surface by exploiting an attack vector. An attack surface may be modeled by various attributes. For example, an attack surface may be a set of technical vectors or non-technical non-technical vectors. Attributes may be automated (derived or inferred via computer automation), ingested (imported into the threat model) or observed. For example, an asset's attack history may be imported (ingested), and then marked as a portion of the attack surface that has more risk (automated/derived), by virtue of the corresponding asset having an attack history. Alternatively, a security team may observe an attack in progress.

Figure 4:
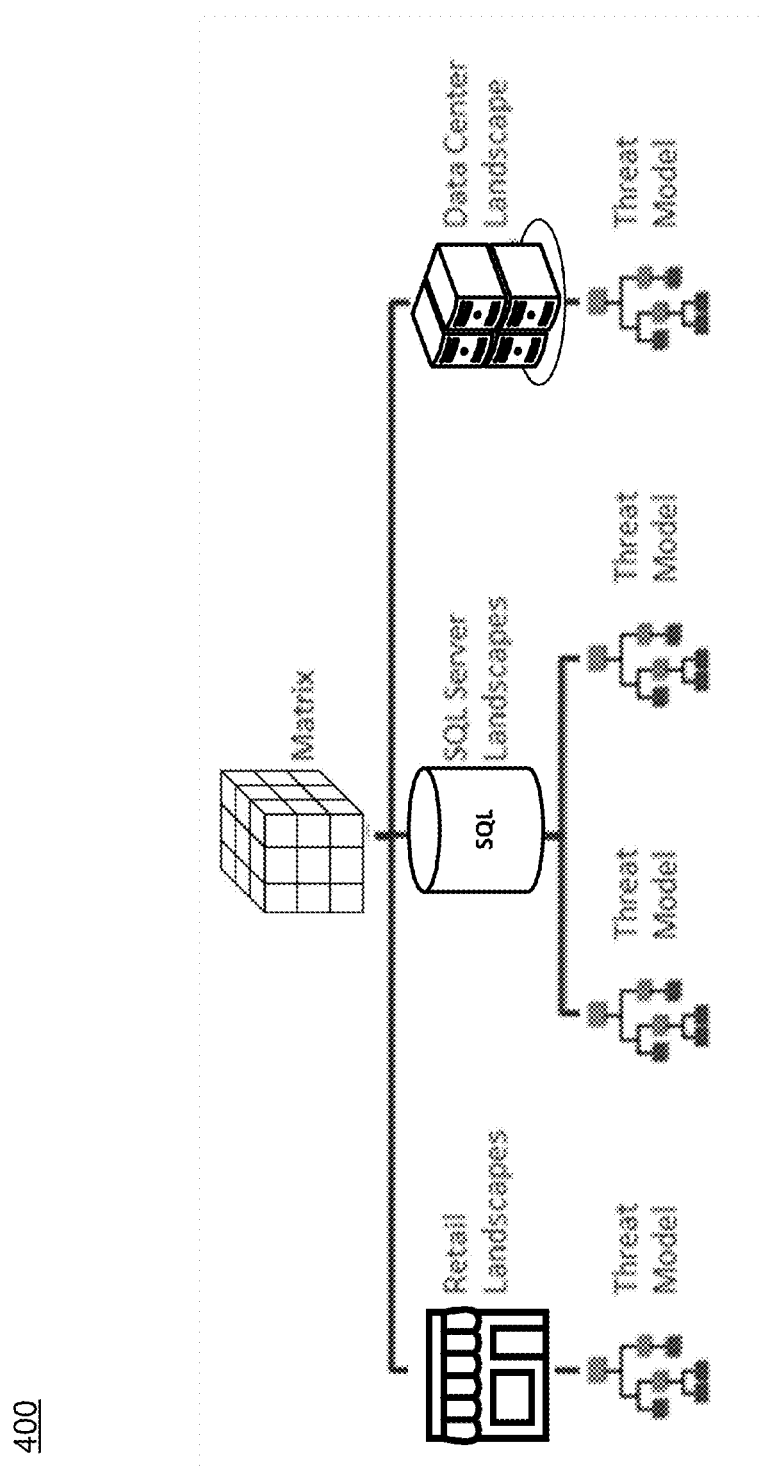
FIG. 4 illustrates the relationship between threat models, threat landscapes, and threat matrices.

A "threat matrix" is comprised of a set of "threat landscapes" and a threat landscape is comprised of a set of Recombinant Threat Models (see FIG. 4). A Recombinant Threat Model may stand on its own within the threat landscape. Alternatively, multiple Recombinant Threat Models may be interconnected together. A threat landscape represents the computer security threats to a logical grouping of assets, such as a set of servers and/or end user computers that provide a function. Some examples of assets covered by a threat landscape include retail centers, data centers, a grouping of similar server types, executive management group and others. A set of threat landscapes in turn comprise a threat matrix that represents all the threats faced by an Enterprise, Government or an organization in general.

Indicators and Responses

A Recombinant Threat Model not only identifies potential attack vectors and associated responses, it can also identify "threat indicators". A Threat indicator, is some detectable event that may be subtle or obvious that suggests that a vulnerability is likely to be exploited by a threat. Therefore, threat indicators will trigger responses to prevent, contain, or eliminate an attack in progress. Thus remediation is accomplished by performing one or more responses for a threat.

For each attack vector, a Corporate Security Officer or other responsible party ideally will have identified a response. The response ideally is proactive by preventing the attack or eliminating the vulnerability. For example, a threat may come from a disgruntled worker. Firing and removing the worker may prevent the attack. Alternatively, the NT Ping of Death could be eliminated by upgrading all NT servers to a later version, or by closing the vulnerable port. Sometimes the response may be reactive, where damage is limited and contained prior to stopping the attack. Reactive responses are generally dynamic in nature, and are triggered upon detecting a threat indicator.

Thus a threat matrix, comprised of Recombinant Threat Models, is populated not only with attack vectors grouped into attack surfaces, it will be cross referenced to responses corresponding to a respective attack vector, and will be cross referenced to threat indicators which if detected indicate a likelihood that a corresponding attack vector is about to occur.

Attack Histories and Assessments

Attack vectors indicated in an attack surface are not necessarily actual attacks in progress but rather represent potential attack. Accordingly, not all attack vectors indicated in an attack surface will be exploited by a threat. In fact, ideally none of the attack vectors would be exploited in the first place, and all responses would be proactive. However, in practice organizations are in fact attacked. A threat matrix not only can store responses, it can also store what threats have exploited attack vectors, and it can also store the effectiveness of the response. In this way, the threat matrix can track efficacy of responses.

In practice, some responses are effective, but unfortunately some are not. A Corporate Security Officer or other responsible party may then update the threat matrix with improved responses, thereby eliminating the previously exploited threat as a risk.

Exemplary Hardware, Software and Communications Environment

Figure 5:
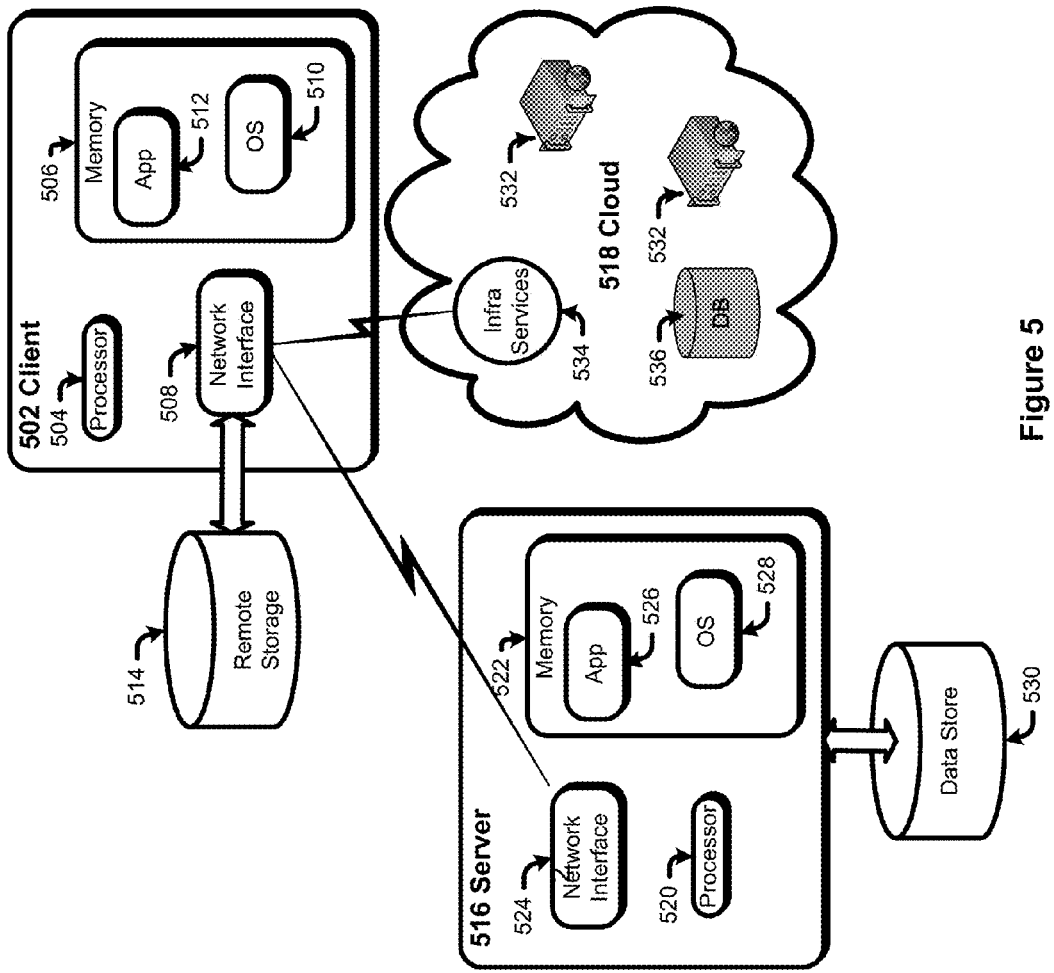
FIG. 5 is an exemplary hardware, software and network environment for Recombinant Threat Models and Threat Matrices.

FIG. 5 is a diagram 500 of an exemplary hardware, software and communications environment for Recombinant Threat Models and Threat Matrices.

Requests to the recombinant threat model infrastructure may be performed from a client machine 502. A client machine 502 may be any device with a processor 504, memory, 506 and a network interface 508 sufficient to connect to a cloud server, either directly or via the Internet. Typically there will be an operating system 510 and one or more applications 512 resident in the memory 506. Typical configurations are a central processing unit, RAM, and Wi-Fi or Ethernet connectivity. The memory 506 will be computer-readable media and/or will have access to other computer-readable media, and will run a client application 512 comprised of computer executable code resident in the memory and/or other computer-readable media. The client 502 may have access to remote storage 514 such as Network Aware Storage (NAS) 516 on the local network.

Similarly a server 516 or cloud services 518 hosting the server side of the recombinant threat model infrastructure may be a device with a processor 520, memory 522, and a network interface 524 sufficient to connect to a client machine either directly or via the Internet. As with a client machine, typically there will be an operating system. Typical configurations are a central processing unit, RAM, and Wi-Fi or Ethernet connectivity. The memory will be computer-readable media and/or will have access to other computer-readable media, and will run an application 526 and operating system 528 comprised of computer executable code resident in the memory and/or other computer-readable media. The server may access have a database or datastore 530 locally or on its local network.

A cloud server 532 may generally run a virtualization environment 534 that may create virtual machines. In each virtual machine, there may be an operating system, or system level environment. Each virtual machine may spawn processes, each of which may spawn threads. An execution environment such as a Java Virtual Machine, or .NET runtime may execute in a virtual machine and manage processes and threads. Servers 532 may also come in the form of database servers 536 as well.

Note that computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Figure 6:
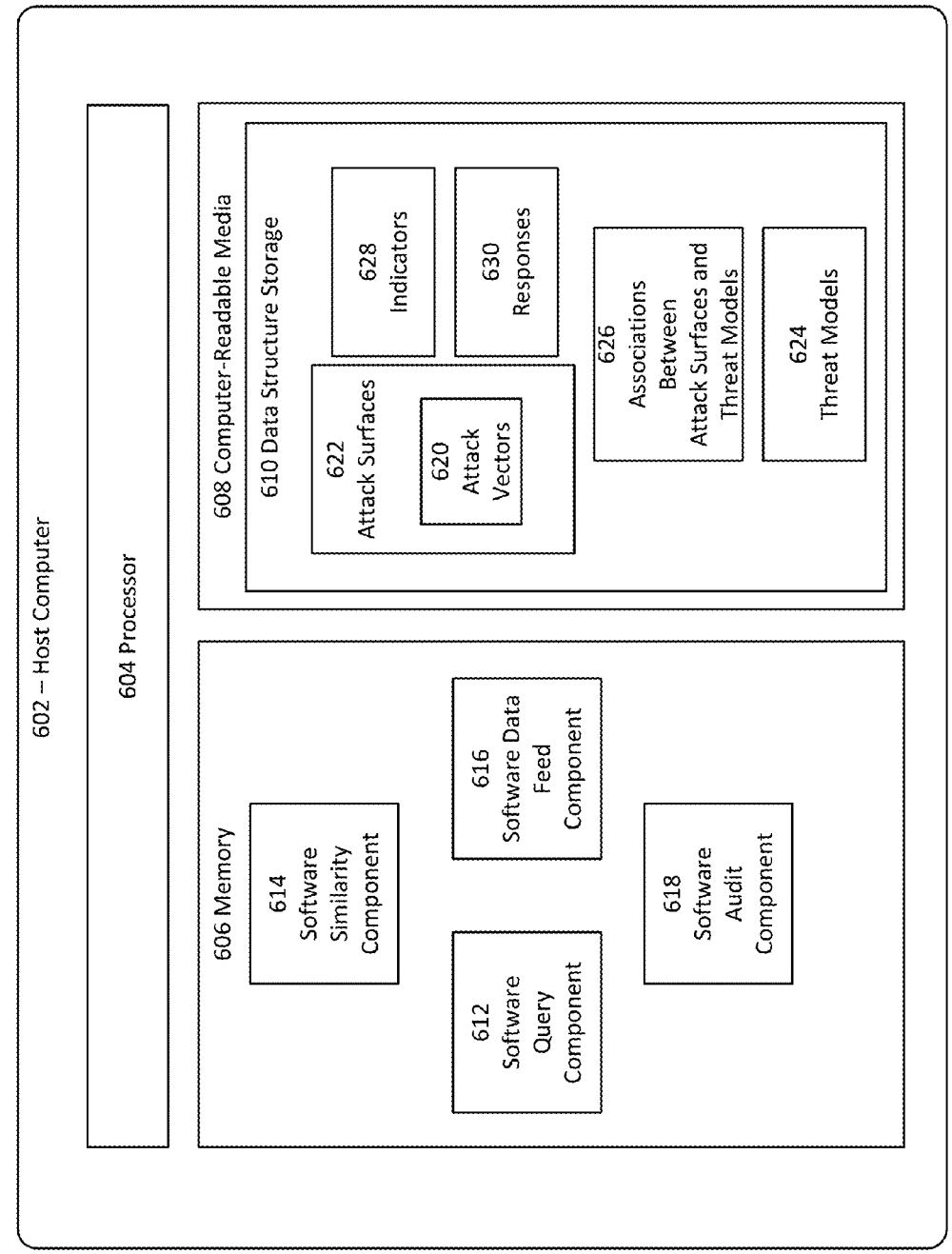
FIG. 6 is an exemplary block diagram for Recombinant Threat Models and Threat Matrices.

FIG. 6 is an illustration 600 of a configuration for an exemplary system to support Recombinant Threat Models. The configuration comprises a computer host system 602 with a processor 604, a computer-readable memory 606, and a computer-readable medium 608. The memory 604 may be RAM and the computer-readable medium 606 may be persistent such as a disk storage. The computer-readable medium may store a data structure storage 610 for Recombinant Threat Models and Threat Matrices. The data structure storage 610 is a software data structure, such as a graph or set of tables to store recombinant threat model data. The computer-readable medium 608 may be separate from the processor 604 and memory 606 and may execute on a network aware storage or a database server on the network, on the Internet, or on a cloud service.

In the memory 606 is a software query component 612, a software similarity component 614, a software data feed component 616 and a software audit component 618.

The software query component 612 is configured to receive query data. Typical query data is in the form of an observed event. The observed event may be described with one or more attributes. The software query component may also receive a filter indicator. When performing a query, the software query component 612 communicates with a software similarity score component 614 that provides similarity scores between entities. Entities are comprised of a set of attributes and are described further with respect to the discussion around the data structure storage 610 below.

The software similarity component 614 may apply a similarity score between two entities. In one embodiment the software similarity component 614 may enumerate at least some attributes (sometimes called fields) for a first entity and enumerate at least some attributes for a second entity. First, the field names and types are then aligned by similarity of name and type. Then the values of the fields are subjected to similarity score. The similarity between the two entities may the normalized sum of the constituent pairwise attribute similarities. In this way, entities with different attributes may be scored for similarity. Note that the software similarity component 614 does not actually state that entities are in fact similar. Rather it merely generates a score. The similarity score is used in conjunction with a predetermined threshold, which if exceeded, indicates sufficient similarity.

The software similarity component 614 may also be used in conjunction with a software data feed component 616. The software data feed component 616 is a loader that received attack vector, attack surface, and threat model data. The software data feed component 616 loads the attack vector, attack surface and threat model data into respective instances. However, the software data feed component 616 may use the software similarity component 614 to create or infer associations between threat models and attack surfaces. This is possible because the software similarity component 614 performs pairwise attribute comparisons.

It is possible that associations inferred between entities by the software query component 612 during query time, and the software data feed component 616 at load time may not be correct. Accordingly, any use or creation of an inferred association is stored by a software audit component 618.

The data structure storage 610 stores entities that may have different attributes. Entities include attack vectors 620, attack surfaces 622, threat models 624 and associations of attack surfaces and threat models 626. Records for each entity are called instances. Note that the data structure storage need not be implemented as a relational database. Each entity might be specified as an abstract base class, so that an instance that derives from the abstract base class may have different attributes. For example, an attack surface instance may have different attributes with a second attack surface instance.

Attack vector 620 and attack surface entities 622 not only are associated with vulnerabilities and attack surfaces respectively, but may also be associated with indicator data 628 and with response data 630. Indicator data 628 describe events that if observed change the likelihood that the respective attack vector and attack surface will occur. Typically, indicators show that the likelihood is increasing, and that responses to remediate should be taken proactively.

The associated response data 630 stores recommended remediation procedures for the respective attack vector and attack surface. The response data 630 can also store an indicator, such as a field or flag, that the response is not effective. This efficacy data may be used to change the priority of responses returned during a query.

Threat Model Methods
Overview of Threat Model Methods

Herein is described techniques to develop Recombinant Threat Models. Recombinant Threat Models will store information about (a) attack surfaces and their associated attack vectors, (b) network assets targeted by those attack vectors, (c) threat profiles in the form of indicators, (d) attack histories, and (e) historical responses to attacks. The Recombinant Threat Models may be combined into a unified Threat Matrix. The information stored would not be limited to a particular company or installation, but would include publically available information. The Threat Matrix would be used to correlate threats from different Recombinant Threat Models and to quickly and automatically update Responses stored in the Threat Matrix.

Initial Population of the Threat Model

Inputs into a proposed Threat Matrix include attack vectors, collected into one or more attack surfaces, attack histories, and historical responses. Sources for attack surfaces may include internal data organized into existing attack trees. Other sources may include third party sources such as data from the Federal Government via the National Institute of Standards and Technology.

The attack vectors may also be correlated with Indicators from threat profiles and other sources. Indicators may be gleaned by reviewing attack histories (e.g. from SIEM) and from historical responses. Collection of historical responses may be automated via RSS feeds, external fees, or spiders programmed to crawl the Internet searching for reports of cyber attacks.

In this way, a Threat Matrix comprised of Recombinant Threat Models would be more complete, and would take advantage of cross-correlating information from different Threat Models, thereby producing a more robust way to detecting attacks and way to respond. By analyzing the Threat Matrix using machine learning and pattern matching capabilities, a Corporate Security Officer will be able to address threat intelligence from a lateral perspective providing the Corporate Security Officer a much more accurate picture of threat relative to threat landscapes and thereby more accurately assess organizational risk.

Figure 7:
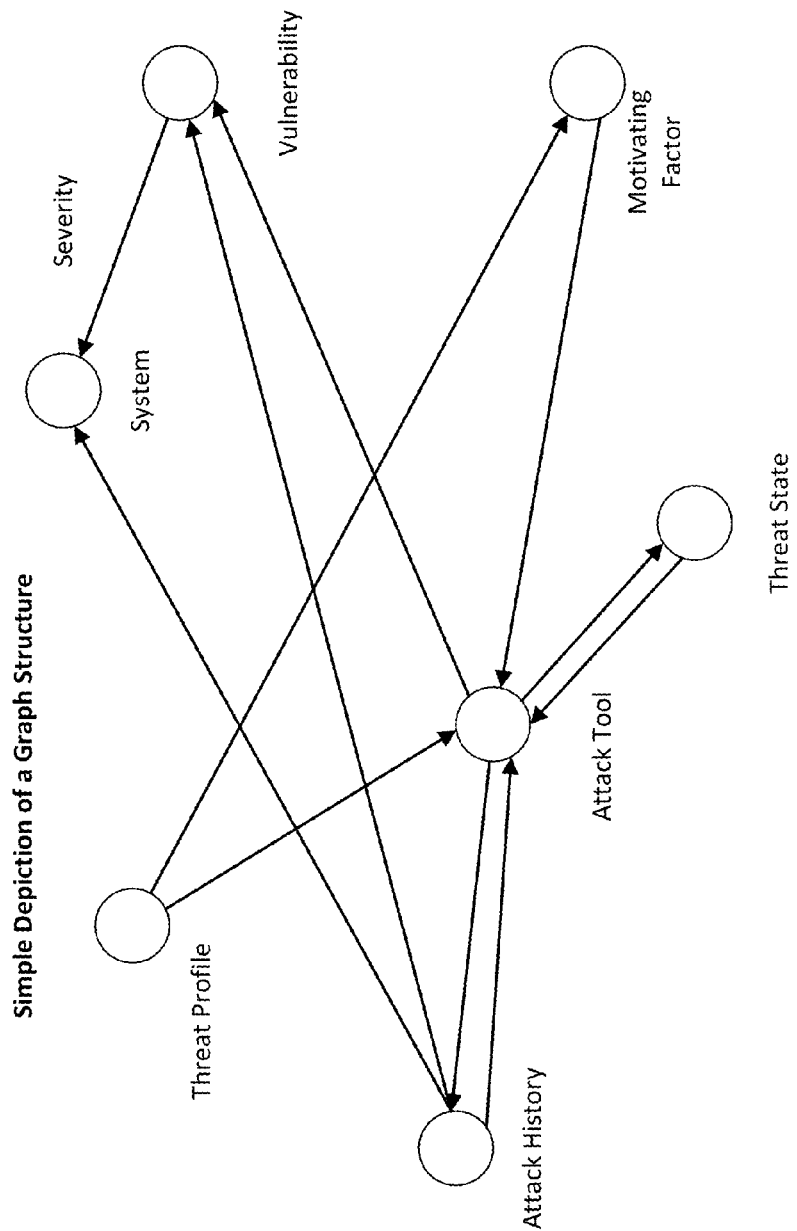
FIG. 7 is an exemplary graph structure.

The underlying data structure for the Threat Matrix and Recombinant Threat Models may be in the form of a digraph data structure (hereinafter "graph"). (See FIG. 7 for an exemplary digraph).

Data representing technical and non-technical data points will be ingested into a graph data structure as a series of graph nodes.

Each node represents an entity within the threat matrix and may represent a threat actor, a threat profile, a vulnerability, attack history, a response, or the like. Nodes may have multiple properties and labels.

Nodes have relationships (edges) to other nodes that can also contain properties. Nodes and relations are used to develop the threat model.

Relationships within the graph determine how the surface areas or model nodes are developed. Relations in the threat model represent vectors from a surface area to another surface area.

Note that since all the nodes are in the same graph, a node from one Threat Model may be connected and therefore correlated to a node from a different Threat Model.

Further note that since historical responses include input from Spiders, this approach automates the addition of third party threat information from outside the organization.

The structure of the nodes themselves may be in the form of abstract classes where records are represented as object instances. One proposed model might be to have an abstract class each for an Attack Vector, an abstract class for a Recombinant Threat Model, and to store the Threat Model instances in a Threat Matrix comprised of a graph of the Threat Model and Attack Vector Instances. The attack vector instances could be grouped together to comprise attack surfaces.

The Threat Matrix may be implemented as a graph of Threat Model Abstract Classes. In effect the Threat Matrix becomes a map of the Threat Model Instances. This allows an arbitrary Threat Model Instance, with arbitrary attributes to be part of the Threat Matrix graph.

An attack surface (call it S) may store the particular attributes for a Human Factors vulnerability for a compromised employee as follows:
Employee Tenure=No
Last Review=Bad
Salary=Clerical Range A Recombinant Threat Model (call it M) might have the particular attributes, also for a Human Factors vulnerability as follows:
Length of Term=1 year
Job Performance=2/5
Compensation=$30,000

To determine whether a threat model should be associated with an Attack Vector, a matching/similarity algorithm may match surface S to model M. Note that the attributes may have different names and may have different value types. First, the matching/similarity algorithm may determine that the "Last Review attribute in S maps to "Job Performance" attribute in M. Then, the matching/similarity algorithm may determine that the binary Bad/Good "Last Review attribute in S is similar to the 2 out of 5 scalar "Job Performance"

attribute value in M and therefore matches. Various known similarity scoring and fuzzy logic scoring algorithms may be applied.

A predetermined threshold for similarity may be applied to the matching/similarity algorithm. Specifically, the matching/similarity algorithm takes a threat model instance and enumerates the attributes of that threat model instance. It then selects a candidate attack surface instance to associate with the threat model and enumerates the attack surface's attributes. It pairwise calculates the similarity of the threat model instance attributes with the attack surface instance attributes. It then calculates a relevancy score of the threat model instance to the attack surface instance. If the relevancy score exceeds the predetermined threshold, then the threat model instance and the attack surface instance are to be associated.

Responding to Indicators of Attacks

Upon populating the Threat Matrix, responses may be determined as follows:

First the system receives an observed event. The observed event is comprised of a set of attributes that are comparable to indicator data associated with attack vector instances and attack surfaces.

The system then searches the graph for indicators that are similar to the observed event. The software similarity component may perform attribute comparisons if the attributes of the observed event are different from the indicator to be analyzed. Where an indicator is found to exceed a predetermined threshold of similarity, the associated attack vector instances and associated attack surface instances are retrieved.

Note that any of the entities in the data structure storage may be associated with an indicator, such as a flag or a field, that it is associated with a filter. If the software query component is configured to run a query with a filter, i.e. in fast query mode, the software query component will only perform similarity searches on nodes with the appropriate filter indicator set. Because comparing fields is faster than performing similarity searches, fast query mode typically will be faster than a query solely performing similarity searches.

Responses associated with the retrieved attack vector instances and attack surface instances are reported by the system. At least some of the responses are performed for remediation.

Recall that one of the features of Recombinant Threat Models is to provide data from more than one model. The system can identify a first set of threat models associated with returned attack surface instances. Accordingly, the software similarity component may also, upon the direction of a user, create a second set of threat models and attack surfaces similar to threat models in the first set of threat models. Note that the software similarity component may compare not only threat models to threat models but also threat models with attack surfaces.

This second set in turn provides a user with another set of potential remediation methods. Specifically, the attack surfaces and the attack vectors associated with returned attack surfaces are associated with response data. The user may perform at least some of the remediation procedures described in the response data as well.

Another feature of the Recombinant Threat Models is to reduce the likelihood of false positives in remediation. Specifically, a user should be presented with remediation responses most likely to address an attack without overwhelming the user with the volume of potential responses.

Where responses are found to be ineffective or not relevant, the graph can determine which responses would not have been retrieved had a different predetermined threshold of similarity been used. Specifically, ineffective or not relevant responses (false positives) are collected and their respective attack surfaces and threat models reviewed. If the majority of false positives were from the second set of retrieved threat models and attack surfaces, then a higher predetermined threshold is recommended.

Updating Recombinant Threat Models

The Threat Matrix and the underlying Threat Models ideally are updated from time to time. Some threats or attacks expire. New Response techniques are developed. Automatically generated correlations may be incorrect. As the size of the Threat Matrix grows, performance optimizations may be added.

One optimization is to prune expired threats and attacks from the underlying graph. In the case for a threat, an event occurs indicating that a party is no longer a threat. For example, a long time hacker is arrested. In that event, the graph may be searched for all attacks associated with the threat. Data associated solely with that threat may be removed from the graph and archived. It is important not to remove data for attacks that are associated with other threat entities, since those attacks may still be initiated, albeit by another threat entity.

In the case of expired attacks, an event occurs indicating that an attack vector is no longer a vulnerability. For example, there may be a router subject to an attack that has been removed from the network. Since the router is no longer in the network, it is no longer a vulnerability. Accordingly, attacks specific to that router may be removed.

Alternative to removal, data associated with an expired threat or attack may simply be marked with a low priority as to be skipped for a fast graph traversal. Specifically, as the graph is traversed, if user or machine searching the graph so indicates, searches will skip nodes marked with a low priority, thereby saving the processing time to compare low priority nodes.

In general, the graph may be subject to different filters. Since over time, the graph will grow to be quite large, nodes belonging to a commonly traversed subset may store a flag or field value indicating that it belongs to a particular subset. Traversals subject to a filter on the subset would then only review nodes with the corresponding flag or field value set.

Commonly accessed nodes may also be cached. Specifically, some graph queries are commonly executed. Accordingly, where the data is expected to be static, those nodes may be cached to speed retrieval.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system to perform computer security threat analysis, comprising:
 a processor, configured to execute computer executable instructions;
 a memory, communicatively coupled with the processor;
 a computer readable medium, communicatively coupled with the processor;

a data storage structure, resident in the computer readable medium configured to store a plurality of attack surface instances, a plurality of attack vector data instances, each attack vector data instance configured to store an association to one or more attack surface instances, a plurality of threat model instances, and a plurality of associations between attack surface instances and threat model instances, wherein:
- an attack vector data instance represents a vulnerability in a defense of a computer network,
- an attack surface instance comprises a set of attack vector data instances for a respective portion of the computer network,
- a threat model instance comprises an array of attack surface instances, and
- information in at least one threat model instance of the plurality of threat model instances is cross-correlated with information in a different threat model instance of the plurality of threat model instances; and a software query component resident in the memory and communicatively coupled to the data storage structure, the software query component configured to return data based at least on an association between an attack surface instance and a threat model instance, wherein the computer executable instructions direct the system to perform a procedure to remediate the vulnerability associated with the at least one attack vector or the at least one attack surface, wherein the instructions to perform the procedure are in response to indicator data that indicates a likelihood of the at least one attack vector or the at least one attack surface occurring.

2. The system of claim 1, wherein the data storage structure is further configured to store the indicator data, the indicator data associated with either an attack vector instance or with an attack surface instance and describing an event that indicates the likelihood of the associated instance.

3. The system of claim 1, wherein the data storage structure is further configured to store response data, the response data associated with either an attack vector instance or with an attack surface instance and describing the procedure to remediate the vulnerability.

4. The system of claim 1, wherein the data storage structure associates the plurality of threat models in a threat matrix, wherein the plurality of threat models is structured in a digraph, and wherein the threat models have different attributes.

5. The system of claim 4, further comprising a software similarity component communicatively coupled to the software query component, the software similarity component storing a similarity function to determine a similarity score between two entities, and wherein the software query component is configured to infer a digraph link between two entities if the similarity score between the two entities exceeds a predetermined threshold.

6. The system of claim 5, wherein the similarity score between two entities is determined at least by the similarity score between corresponding attributes of the two respective entities.

7. The system of claim 5, wherein the software query component is configured to return an attack surface instance not initially associated with a threat model, but associated to the threat model by an inferred digraph link between the threat model and the attack surface.

8. The system of claim 5, further comprising a software data feed component, communicatively coupled to the software similarity component, configured to receive and load data into the data storage structure by creating corresponding attack surface instances, threat model instances, and to create associations between the attack surface instances and threat model instances based at least one similarity scores performed by the software similarity component.

9. The system of claim 8, further comprising a software audit component, resident in the memory and communicatively coupled to the software query component and the software data feed component, to store inferred associations between attack surfaces and threat models used in queries or created during receiving and loading data into the data storage structure respectively.

10. The system of claim 1, wherein the data storage structure is further configured to store attack history data, the attack history data associated with either an attack vector instance or an attack surface instance.

11. The system of claim 1, wherein at least some of the attack surface instances or at least some of the threat model instances are associated with an indicator that the software query component is to not consider the instance when performing a traversal query, thereby providing a filter for the traversal query.

12. A method of performing computer security threat analysis, comprising:
- receiving data of an observed event;
- searching a data storage structure on a computer for the observed event via a software query component on the computer, the data storage structure storing:
  - a plurality of attack surface instances,
  - a plurality of attack vector data instances, each attack vector data instance configured to store an association to one or more attack surface instances,
  - a plurality of threat model instances,
  - a plurality of associations between attack surface instances and threat model instances, wherein:
    - an attack vector data instance represents a vulnerability in a defense of a computer network,
    - an attack surface instance comprises a set of attack vector data instances for a respective portion of the computer network,
    - a threat model instance comprises an array of attack surface instances, and
    - information in at least one threat model instance of the plurality of threat model instances is cross-correlated with information in a different threat model instance of the plurality of threat model instances,
  - indicator data associated with at least one attack vector or at least one attack surface, the indicator data describing an event that indicates a change in the likelihood of the associated attack vector or attack surface occurring; and
  - response data associated with at least one attack vector or at least one attack surface, the response data describing a procedure to remediate the associated at least one attack vector or at least one attack surface;
- identifying indicator data stored in the data storage structure where the indicator data's described event is similar to the received observed event,
- returning data from the data storage structure based at least on the identified indicator data; and
- performing the procedure included in the response data to remediate the vulnerability associated with the at least one attack vector or the at least one attack surface, wherein the performing the procedure is in response to the indicator data.

13. The method of claim 12, wherein the identifying indicator data is based on a similarity score calculated by a software similarity component.

14. The method of claim 12, wherein the returning data from the data storage structure is based at least on inferring that attack surface instance is associated with a threat model based at least on a similarity score calculated by a software similarity component, and the similarity score exceeding a predetermined threshold.

15. The method of claim 14, wherein the data storage structure is further configured to store efficacy data of response data, the efficacy data associated with at least one response and the method further comprises:
storing in the data storage structure efficacy of responses; and
reporting responses data with an associated efficacy below a predetermined efficacy threshold.

16. The method of claim 15, further comprising:
determining whether at least some responses with an associated efficacy below a predetermined efficacy threshold would not have reported had the software query component used a higher predetermined threshold; and
reporting a recommended higher predetermined threshold.

17. A method of initializing a computer security system, comprising:
receiving with a software data feed component a data feed;
storing within a data storage structure data from the data feed, the data storage structure comprising:
a plurality of attack surface instances,
a plurality of attack vector data instances, each attack vector data instance configured to store an association to one or more attack surface instances,
a plurality of threat model instances,
a plurality of associations between attack surface instances and threat model instances, wherein:
an attack vector data instance represents a vulnerability in a defense of a computer network,
an attack surface instance comprises a set of attack vector data instances for a respective portion of the computer network,
a threat model instance comprises an array of attack surface instances, and
information in at least one threat model instance of the plurality of threat model instances is cross-correlated with information in a different threat model instance of the plurality of threat model instances,
indicator data associated with at least one attack vector or at least one attack surface, the indicator data describing an event that indicates a change in the likelihood of the associated attack vector or attack surface occurring; and
response data associated with at least one attack vector or at least one attack surface, the response data describing a procedure to remediate the associated at least one attack vector or at least one attack surface; and
performing the procedure included in the response data to remediate the vulnerability associated with the at least one attack vector or the at least one attack surface, wherein the performing the procedure is in response to the indicator data.

18. The method of claim 17 further comprising: creating associations between the attack surface instances and threat model instances via the software data feed component, based at least one similarity scores performed by a software similarity component.

19. The method of claim 18, wherein the associations between attack surface instances and threat model instances are configured to store an indicator that a created association is a false positive, such that queries performed by a software query component will ignore the false positive.

20. The method of claim 17, wherein the data feed is any one of an automated data feed from a spider crawling the internet, and a Rich Site Summary (RSS) data feed.

* * * * *